(12) United States Patent
Ustuner et al.

(10) Patent No.: US 6,432,054 B1
(45) Date of Patent: Aug. 13, 2002

(54) MEDICAL ULTRASONIC IMAGING WITH ADAPTIVE SYNTHESIS AND COMPOUNDING

(75) Inventors: Kutay F. Ustuner, Mountain View; Mirsaid S. Bolorforosh, Portola Valley; Albert Gee, Los Altos, all of CA (US)

(73) Assignee: Acuson Corporation, Mountain View, CA (US)

(*) Notice: Subject to any disclaimer, the term of this patent is extended or adjusted under 35 U.S.C. 154(b) by 101 days.

(21) Appl. No.: 09/603,283

(22) Filed: Jun. 26, 2000

(51) Int. Cl.[7] .................................................. A61B 8/00
(52) U.S. Cl. ...................................... 600/437; 600/443
(58) Field of Search ........................ 600/437, 443–447, 600/455–458; 73/602, 625, 626

(56) References Cited

U.S. PATENT DOCUMENTS

| | | | |
|---|---|---|---|
| 4,531,019 A | | 7/1985 | Foissner et al. |
| 5,476,098 A | | 12/1995 | O'Donnell |
| 5,664,575 A | * | 9/1997 | Banjanin et al. ............. 600/455 |
| 5,891,038 A | | 4/1999 | Seyed-Bolorforosh et al. |
| 5,908,390 A | * | 6/1999 | Matsushima ................. 600/447 |
| 5,910,115 A | | 6/1999 | Rigby |
| 6,210,332 B1 | * | 4/2001 | Chiao et al. ................. 600/443 |
| 6,282,963 B1 | * | 9/2001 | Haider ......................... 73/602 |
| 6,312,384 B1 | * | 11/2001 | Chiao ........................... 600/443 |
| 6,315,729 B1 | * | 11/2001 | Averkiou et al. ............ 600/458 |

* cited by examiner

Primary Examiner—Francis J. Jaworski
Assistant Examiner—Ali M. Imam (57) ABSTRACT

A medical diagnostic imaging system generates a compounded beam signal C by combining first and second beam signals B1, B2 subsequent to detection and a synthesized beam signal S by combining the first and second beam signals B1, B2 prior to detection. The compounded signal C and the synthesized signal S are then adaptively weighted in response to a selection signal and combined to form an image signal. In this way, the compounded signal C is made to dominate in regions of the image that benefit from increased contrast resolution and the synthesized signal S is made to dominate in regions of the same image that benefit from increased detail resolution.

83 Claims, 4 Drawing Sheets

MEDICAL ULTRASONIC IMAGING WITH ADAPTIVE SYNTHESIS AND COMPOUNDING

BACKGROUND

This invention relates to medical ultrasonic imaging systems, and in particular to methods for improving contrast and detail resolution in such systems.

In conventional medical ultrasonic imaging, beam signals are filtered with filters of different band passes, and the filtered beam signals are then combined, either before or after envelope detection.

In one approach described in Bolorforosh U.S. Pat. No. 5,891,038, assigned to the assignee of the present invention, the two beam signals are combined prior to envelope detection and then displayed. This operation is conventionally known as a synthesizing operation, and it can improve the spatial resolution of the resulting image signal in some situations. Alternatively, the filtered beam signals can be envelope detected prior to combination as described in Lizzi U.S. Pat. No. 4,531,019. This operation is commonly known as compounding, and it can improve the contrast resolution of the resulting image in some cases.

In these prior-art approaches, beam signals are either compounded for an image frame or synthesized for an image frame.

SUMMARY

The preferred embodiments described below adaptively combine the information from two or more different beam signals characterized by different frequency bands. These two or more beam signals are combined prior to envelope detection in a synthesis operation, and they are also combined subsequent to envelope detection in a compounding operation. The compounded and synthesized beam signals are then weighted and combined to produce the image signal. The weighting factors are adaptively chosen to emphasize either the compounded beam signal or the synthesized beam signal, depending upon the currently prevailing beam signal characteristics. In this way, the synthesized beam signal can be made to dominate in regions of the image frame where improved detail resolution is important and the compounded beam signal can be made to dominate portions of the same image frame where improved contrast resolution is important. Alternative embodiments use the local intensity, variance, coherence factor, or signal to noise ratio of one or more of the beam signals to select the weighting factors.

The foregoing paragraphs have been intended by way of introduction, and they are not intended to limit the scope of the following claims.

DETAILED DESCRIPTION OF THE PRESENTLY PREFERRED EMBODIMENTS

Figure 1:
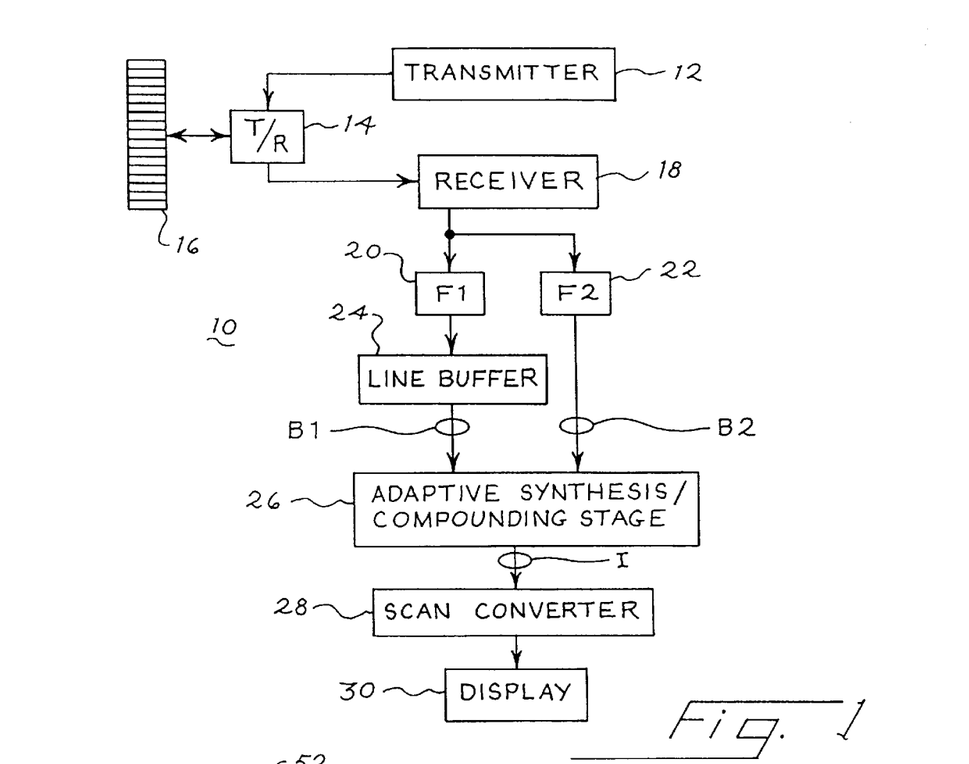
FIG. 1 is a block diagram of a medical ultrasonic imaging system that incorporates a preferred embodiment of this invention.
Figure 10:
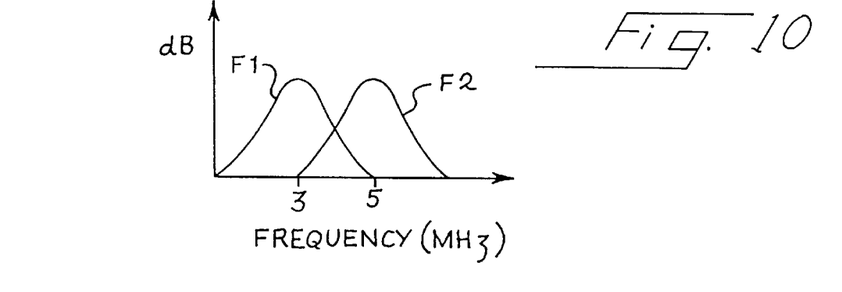
FIG. 10 is a diagram illustrating the band passes of the two filters of FIG. 1.

Turning now to the drawings, FIG. 1 shows a block diagram of an ultrasonic imaging system 10 that incorporates a preferred embodiment of this invention. The system 10 includes a transmitter 12 that generates ultrasonic transmit waveforms that are applied via a transmit/receive switch 14 to a transducer array 16. The transducer array 16 generates ultrasonic pulses in response to the transmit waveforms and directs these ultrasonic pulses into a body being imaged. Echos from the body impinge on the transducer array 16, which converts them to receive signals that are passed via the transmit/receive switch 14 to a receiver 18. The receiver 18 applies appropriate delays and phases to cause receive signals from selected spatial locations in the body being imaged to add coherently to form beam signals. These beam signals are applied to first and second band pass filters 20, 22 that are characterized by distinct frequency band passes. For example, the filters 20, 22 may have band passes F1, F2 as shown in FIG. 10 that peak at 3 and 5 MHz, respectively. Preferably, the band passes F1, F2 are distinct (they do not completely overlap) but they overlap in part. This improves the correlation between the filtered beam signals generated by the filters 20, 22.

The filtered beam signal from the filter 20 is stored in a buffer 24 and then applied as a beam signal B1 to an adaptive synthesis/compounding stage 26. The beam signal B2 filtered by the filter 22 is applied directly to the stage 26. Thus, the beam signals B1, B2 are associated with different transmit events and different frequency band passes. The buffer 24 synchronizes the beam signal B1 with the beam signal B2 such that portions of the beam signals B1, B2 that correspond in time also correspond in spatial location in the body being imaged. By way of example, the transmit waveforms used to acquire the beam signal B1 can be centered at 3 MHz and the transmit waveforms used to acquire the beam signal B2 can be centered at 5 MHz. In this case, the beam signals B1, B2 are both fundamental beam signals. Alternately, one or both of the beam signals B1, B2 may be acquired at subharmonic, harmonic or fractional harmonic frequencies as compared with the insonifying ultrasonic pulse. The body being imaged may include a contrast agent, or it may alternately be free of contrast agent.

The stage 26 combines the beam signals B1, B2 as described in greater detail below in conjunction with FIGS. 2 through 5 to generate an image signal I. The image signal I is applied to a scan converter 28 that generates an output signal suitable for display on a display 30.

The adaptive synthesis/compounding stage 26 will be described in greater detail below. The remaining elements of FIG. 1 may be implemented in any desired manner, and the widest variety of alternatives can be used with this invention. For example, the transmitter 12 and the receiver 18 can be analog or digital devices. The transmitter 12 can generate two- or three-state square wave waveforms, or continuously varying waveforms. The transducer array 18 can be of any desired form, including single-element transducer arrays as well as transducer arrays that are planar or curved and of one or more dimensions. The transmitter 12 and the receiver 18 preferably control the phase of the beam signals B1 and B2 sufficiently well to permit effective synthesis.

Furthermore, additional elements may be included in the signal path of FIG. 1, or selected ones of the illustrated elements may be deleted if not needed. For example, the scan converter 28 may be eliminated if the receiver 18 forms signals at a grid appropriate for the display 30. Similarly, the filters 20, 22 may be deleted, and the differing band passes for the beam signals B1, B2 provided by suitably choosing the ultrasonic frequencies of the respective transmit waveforms generated by the transmitter 12. Also, other techniques can be used to synchronize the beam signals B1, B2, and some of these techniques eliminate the need for line buffer 24. For example, the beam signals B1, B2 can be stored in a memory and then read out of the memory at the appropriate times.

Figure 2:
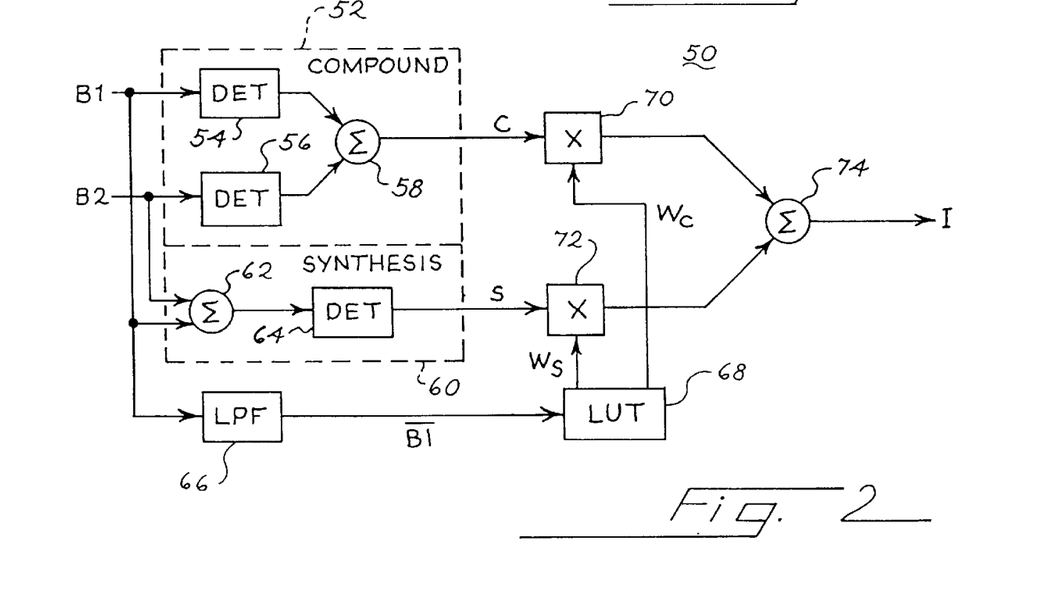
FIGS. 2, 3, 4 and 5 are block diagrams of four separate embodiments of the adaptive synthesis/compounding stage of FIG. 1.

FIG. 12 shows a first embodiment 50 of the adaptive synthesis/compounding stage 26 of FIG. 1. The embodiment 50 includes a compounding stage 50 that includes two envelope detectors 54, 56 and a summer 58. The detectors 54, 56 envelope detect the beam signals B1, B2 respectively, and the detected beam signals are then summed by the summer 58 to generate a compounded signal C. The output of the summer 58 is a compounded signal because the beam signals B1, B2 are envelope detected prior to summation.

The embodiment 50 also includes a synthesis stage 60 that includes a summer 62 and a detector 64. The summer 62 sums the beam signals B1, B2, and the summed beam signals are envelope detected by the detector 64 to form a synthesized signal S. The output of the detector 64 is a synthesized signal because envelope detection is performed after summation.

Figure 6:
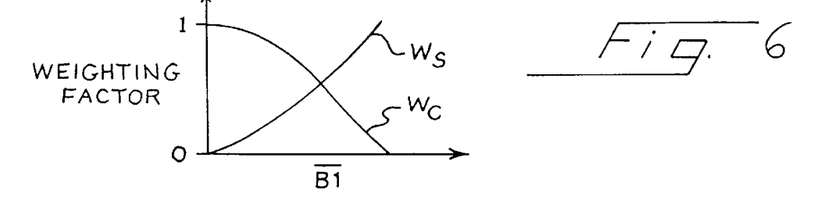
FIG. 6 is a graph showing a relationship between weighting factors that can be used in any of the embodiments of FIGS. 2, 3, 4 or 5.

The embodiment 50 also includes a low pass filter 66 that averages the beam signal $\overline{B1}$ to generate a selection signal $\overline{B1}$. The selection signal $\overline{B1}$ is indicative of the average amplitude of the beam signal $\overline{B1}$, and is applied to a look-up table 68. The look-up table 68 generates two weighting factors $W_s$ and $W_c$ in response to the selection signal $\overline{B1}$. One possible arrangement is shown in FIG. 6, where the weighting factors $W_s$ and $W_c$ are graphed as a function of $\overline{B1}$. Note that low values of the selection signal $\overline{B1}$ are associated with a low value of $W_s$ and a high value of $W_c$. Conversely, high values of $\overline{B1}$ are associated with a high value of $W_s$ and a low value of $W_c$. In this example, the sum of $W_s$ and $W_c$ is equal to 1, regardless of the value of $\overline{B1}$.

Returning to FIG. 2, the compounded beam signal C and the weighting factor $W_c$ are applied to a multiplier 70, and the synthesized beam signal S and the weighting factor $W_s$ are applied to a multiplier 72. Each multiplier 70, 72 forms the product of the associated input signals and generates a weighted output signal that is applied to a summer 74. The summer 74 adds the weighted compounded signal to the weighted synthesized signal to generate the image signal I. In many cases the beam signals B1, B2 will be log compressed. In this case the multipliers 70, 72 may be implemented as adders.

Figure 3:
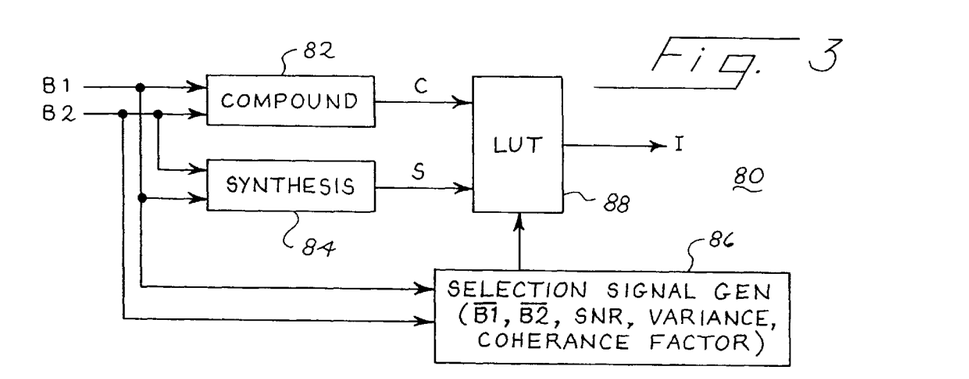

FIG. 3 shows a block diagram of a second embodiment 80 of the adaptive synthesis/compounding stage 26 of FIG. 1. The embodiment 80 includes a compounding stage 82 and a synthesis stage 84 that may be identical to the corresponding elements of FIG. 2. The beam signals B1, B2 are also applied to a selection signal generator 86 that generates a selection signal in response thereto and applies this selection signal to a look-up table 88. The look-up table 88 also receives as inputs the compounded signal C and the synthesized signal S generated by the stages 82, 84, respectively, and produces as an output the image signal I.

The selection signal generator 86 generates the selection signal as a function of one or more of the beam signals B1, B2. In one example, the selection signal generator generates the selection signal as a function of the local average of B1 or the local average of B2. For example, the weighting factor functions graphed in FIG. 6 can be implemented by the generator 86.

Figure 7:
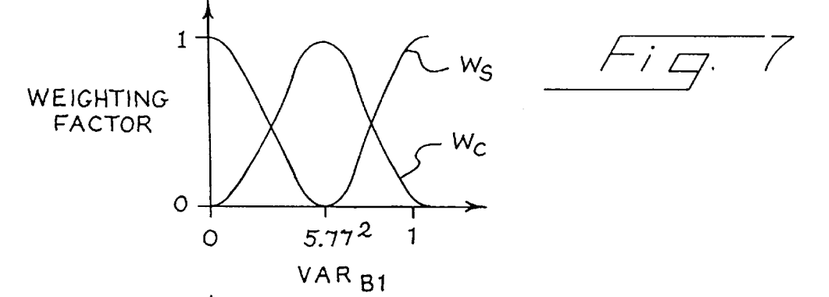
FIGS. 7, 8 and 9 are graphs showing other relationships between weighting factors that can be used in the embodiments of FIGS. 3 and 4.

Alternatively, the selection signal generator 86 may generate the selection signal as a function of the variance of one or more of the beam signals B1, B1. In this connection, the standard deviation (i.e., square root of variance) of log-compressed beam signals associated with soft tissue echoes (i.e., fully developed speckle) is consistently approximately equal to 5.57 dB. It is generally preferable to emphasize contrast resolution for soft tissue and detail resolution otherwise. The weighting factors graphed in FIG. 7 accomplish this result. Note that the weighting factor $W_c$ associated with the compounded signal C peaks at a variance equal to $5.57^2$. This causes the compounded beam signal C to dominate in regions of the image frame associated with soft tissue echoes. Conversely, the weighting factor $W_s$ peaks at values of the variance lower and higher than $5.57^2$, and the synthesized beam signal S with its enhanced detail resolution will dominate in regions of the image frame characterized by a variance substantially different than $5.57^2$.

Figure 8:
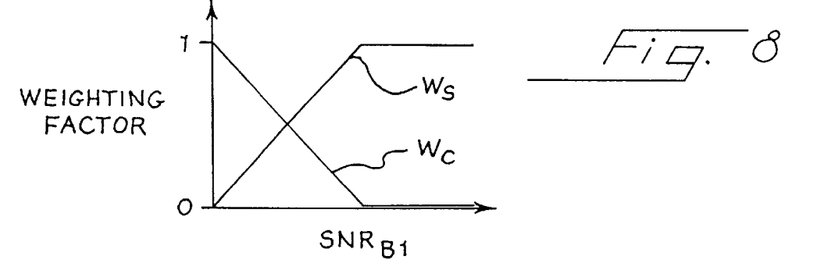

As another alternative, the weighting factors $W_c$ and $W_s$ may vary as a function of the signal to noise ratio (SNR) of one or more of the beam signals B1, B2. For example, the functions graphed in FIG. 8 can be used. In this case, the compounded beam signal C dominates in low-SNR regions of the image frame and the synthesized beam signal S dominates in high-SNR regions of the image frame. In this context, the SNR may either be a point or a regional SNR.

Figure 9:
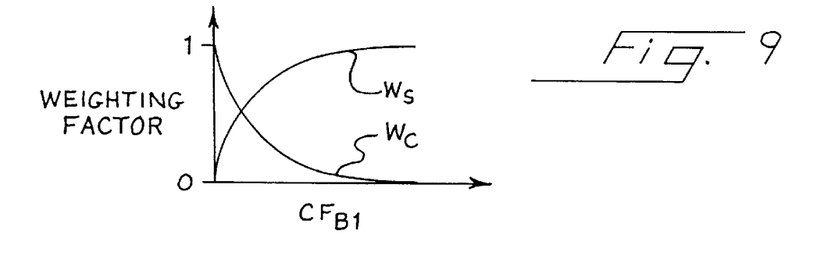

As a fourth alternative, the weighting factors $W_s$ and $W_c$ may be determined as a function of the coherence factor CF or of one or both of the beam signals B1, B2. Coherence factor is defined in Rigby U.S. Pat. No. 5,910,115. The function graphed in FIG. 9 will cause the compounded beam signal C to dominate in regions of the image characterized by a low coherence factor and the synthesized beam signal S to dominate in regions of the image frame characterized by a high coherence factor.

These four examples are intended by way of illustration, and many other parameters of the beam signals B1, B2 can be used to select the weighting factors. Also, combinations of various ones of the approaches described above can be used as well.

The look-up table 88 responds to the selection signal generated by the generator 86 to combine the compounded beam signal C and the synthesized beam signal S using weighting factors that vary as a function of the selection signal.

Depending upon its construction, the look-up table 88 may weight the compounded signal C and the synthesized signal S prior to combining them, with or without generating weighting factors of the type described above. For example, the look-up table 88 may include multiple look-up tables, one associated with each value of the selection signal. In this case, the weighting factors described above can be applied even though no weighting factor signals are generated.

Figure 4:
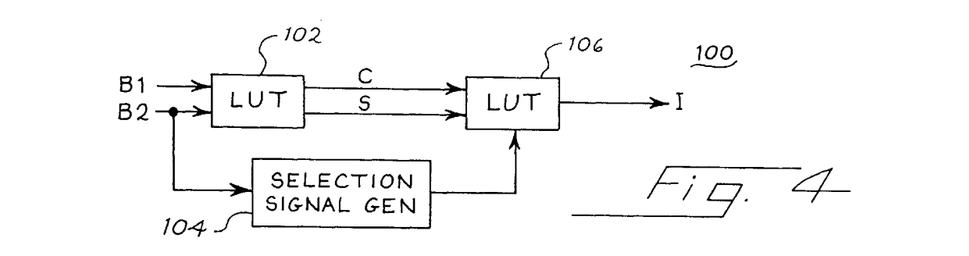

FIG. 4 shows a third embodiment 100 of the adaptive synthesis/compounding stage 26. This embodiment 100 is similar to the embodiment 80 described above, except that a look-up table 102 is used to implement the compounding stage to generate the compounded beam signal C and the synthesis stage to generate the synthesized beam signal S from the beam signals B1, B2. Also, the selection signal generator 104 is responsive to the second beam signal B2.

The look-up table 106 may be identical to the look-up table 88 described above.

Figure 5:
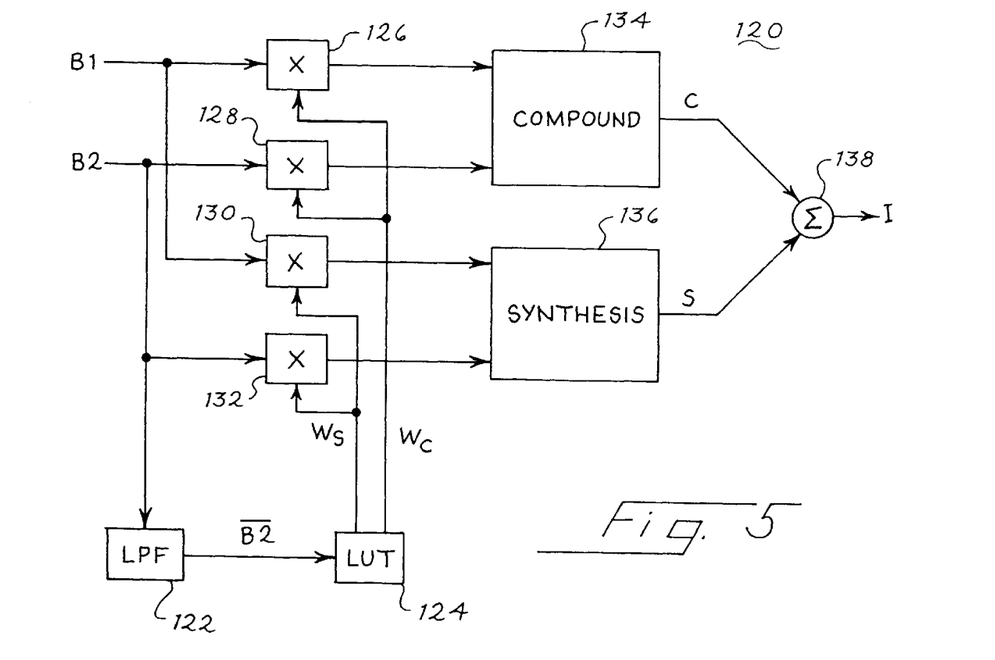

When the weighting functions are linear functions, they can be performed before or after the compounding and synthesis functions. FIG. 5 shows a fourth embodiment 120 of the adaptive synthesis/compounding stage 26. This embodiment 120 includes a low-pass filter 122 and a look-up table 124 that may be identical to the elements 66, 68 described above in conjunction with FIG. 2. In this case, the weighting factor $W_c$ is applied in parallel to two multipliers 126,128 that are also responsive to the beam signals B1, B2, respectively. Similarly, the weighting factor $W_s$ is applied in parallel to two multipliers 130, 132 that also receive as inputs the beam signals B1, B2, respectively. The weighted beam signals generated by the multipliers 126 and 128 are applied to a compounding stage 134 that may be identical to the compounding stage 52 described above in conjunction with FIG. 2. Similarly, the weighted beam signals generated by the multipliers 130,132 are applied as inputs to a synthesis stage 136 that may be identical to the synthesis stage 160 described above in conjunction with FIG. 2.

The stages 134,136 apply compounded and synthesized beam signals C, S to a summer 138, and the summer 138 combines the two input signals to generate the image signal I.

Figure 11:
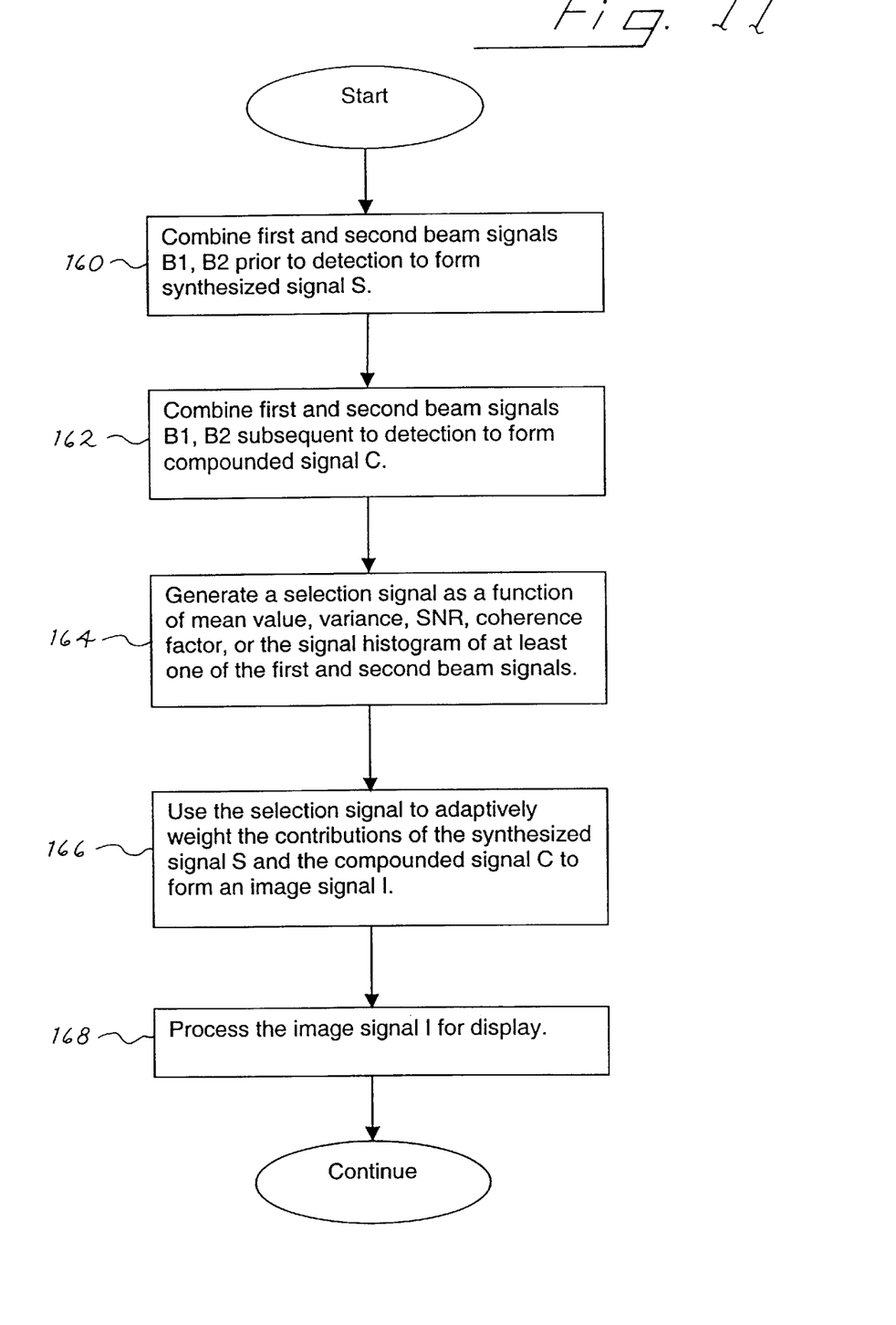
FIG. 11 is a flow chart of a method implemented by the embodiment of FIG. 1.

FIG. 11 illustrates a method implemented by the embodiments of FIGS. 2 through 4 above. The embodiment of FIG. 5 implements a slightly modified version of the method of FIG. 11.

As shown in FIG. 11, at block 160 first and second beam signals B1, B2 are combined prior to detection to form a synthesized signal S. In block 162 the beam signals B1, B2 are combined subsequent to detection to form a compounded signal C.

In block 154 a selection signal is generated as a function of a parameter of one or more of the beam signals B1, B2. As explained above, this parameter can be mean amplitude, variance, SNR, coherence factor, or some combination of these parameters of one or more of the first and second beam signals. At block 166 the selection signal of block 164 is used to adaptively weight the contributions of the synthesized signal S and the compounded signal C to form an image signal I. At 168 the image signal I is processed for display.

From the foregoing it should be apparent that an improved system has been described that uses both the compounded beam signal C and the synthesized beam signal S within the same image frame, and generally within the same image pixel. In this way, the benefits of improved contrast resolution can be provided in appropriate portions of an image frame by weighting the compounded signal more heavily and the advantages of improved detail resolution can be obtained in other regions of an image frame by weighting the synthesized beam signal S more heavily.

Of course, many changes and modifications are possible to the preferred embodiments described above. For example, the weighting factors $W_c$ and $W_s$ may be restricted to the values 0 and 1 in some embodiments. Also, the synthesis stage and the compounding stage may combine the beam signals with unequal weights selected for example as a function of the SNR of the respective beam signals. In this way, beam signals with a higher SNR can contribute to a greater extent to the compounded signal C and the synthesized signal S. Also, three or more beam signals may be used to form the compounded signal C and/or the synthesized signal S.

Other selection criteria can be used in selecting the weighting factors $W_s$, $W_c$ for the synthesized and compounded beam signals, respectively. For example, a histogram may be formed that graphs intensity of one of the detected beam signals versus frequency of occurrence over an acoustic line or a frame. Then some feature of the histogram (e.g. peak, maximum or minimum) can be used to select the weighting factors $W_s$ and $W_c$. For example, histograms indicative of high-intensity beam signals are associated with a high value of $W_s$ and a low value of $W_c$, and histograms indicative of low-intensity beam signals are associated with a low value of $W_s$ and high value of $W_c$.

As another alternative, the first and second beam signals discussed above may be corresponding sub-bands of an initial wide-band beam signal. In this alternative, the initial wide-band beam signal can be substituted for the synthesized signal, and in this case it is the initial wide-band beam signal that is combined with the compounded beam signal, using any of the approaches described above. More generally, the first and second beam signals discussed above (e.g. FIG. 11) may be acquired in a single transmit event, as for example by applying an initial wide-band beam signal to two separate frequency filters.

Signal compression, if performed, may be performed before or after the first and second beam signals are compounded, and before or after the synthesized beam signal (or initial wide-band beam signal) is combined with the compounded beam signal. Signal compression, when used, is not limited to log compression.

In the foregoing examples, the first and second beam signals differ in temporal frequency band. However, the present invention is not so limited. For example, the first and second beam signals B1, B2 discussed above may differ in spatial frequency (either spatial frequency alone or spatial frequency as well as temporal frequency). Such beam signals may be compounded, synthesized, and then combined based on any of the various selection criteria described above. One well-known lateral synthesis technique is synthetic aperture, and one well-known lateral compounding technique is aperture compounding (also known as spatial compounding). In general, beam signals with different spatial frequency spectra can be generated by altering the delay profile and/or the apodization function of the transmit and/or the receive beamforming operations.

As used herein, the term "image signal" is intended to denote a beamformed signal intended for display at any suitable point in the signal processing path, before or after scan conversion. The term "beam signal" is intended to refer to any beamformed signal downstream of the receive beamformer, regardless of its position in the signal processing path.

The term "combine" is intended broadly to encompass averaging, weighted averaging, multiplication, weighted multiplication, whether or not additional signals contribute to the sum or product. The term "combined" is also intended to encompass non-linear combinations such as those easily implemented with a look-up table.

The term "region" is intended to encompass an area of one or more pixels of an image frame, where the frame may be of one, two or more dimensions.

The term "image frame" is intended to encompass part or all of an image frame.

The term "function of" is intended broadly to encompass direct and inverse functions, whether linear or non-linear. Furthermore, a parameter that is said to be a function of a first input signal may or may not vary with other, unnamed input signals. Thus, a parameter that varies with first, second and third input signals is said to be a function of the first input signal.

The foregoing detailed description has been intended by way of illustration, not limitation. It is only the following claims, including all equivalents, that are intended to define the scope of this invention.

What is calmed is:

1. A method for generating a medical ultrasound image signal from at least first and second beam signals, said method comprising:
   (a) combining the first and second beam signals prior to detection;
   (b) combining the first and second beam signals after detection;
   (c) using the combined signals of both (a) and (b) in a single medical ultrasound image frame.

2. The invention of claim 1 wherein the frame comprises first and second regions, and wherein the using act of (c) causes the combined signal of (a) to dominate in the first region and the combined signal of (b) to dominate in the second region.

3. The invention of claim 1 wherein the frame comprises a plurality of pixels, and wherein the using act of (c) uses the combined signals of both (a) and (b) in a selected one of the pixels.

4. The method of claim 1 wherein the first and second beam signals are associated with separate transmit events and are received from common spatial locations.

5. The method of claim 1 wherein the first and second beam signals are characterized by first and second temporal frequency bands, respectively.

6. The method of claim 1 wherein the first and second beam signals are characterized by first and second spatial frequency bands, respectively.

7. The method of claim 5 or 6 wherein the first and second frequency bands partially overlap in frequency and partially do not overlap in frequency.

8. The method of claim 1 or 3 wherein the combined signals used in (c) are pre-compression signals.

9. The method of claim 1 or 3 wherein the combined signals used in (c) are post-compression signals.

10. A method for generating a medical ultrasound image signal from at least first and second beam signals, said method comprising:
    (a) combining the first and second beam signals prior to detection;
    (b) combining the first and second beam signals after detection;
    (c) generating a selection signal;
    (d) combining the combined signals of (a) and (b) using weighting factors that vary as a function of the selection signal.

11. The method of claim 10 wherein the selection signal is generated in (c) at least in part as a function of a parameter of at least one of the first and second beam signals.

12. The method of claim 11 wherein the parameter varies as a function of average amplitude of said at least one of the first and second beam signals.

13. The method of claim 11 wherein the parameter varies as a function of variance of said at least one of the first and second beam signals.

14. The method of claim 11 wherein the parameter varies as a function of coherence factor of said at least one of the first and second beam signals.

15. The method of claim 11 wherein the parameter varies as a function of signal to noise ratio of said at least one of the first and second beam signals.

16. The method of claim 11 wherein the parameter varies as a function of a histogram of at least a portion of said at least one of the first and second beam signals.

17. The method of claim 16 wherein said at least a portion comprises a single acoustic line.

18. The method of claim 16 wherein said at least a portion comprises an image frame.

19. The method of claim 10 wherein the combined signal of (d) is associated with a single pixel of a medical ultrasonic image frame.

20. The method of claim 10 wherein the combined signal of (d) is dominated by the combined signal of (a) in a first portion of a medical ultrasound image frame, and wherein the combined signal of (d) is dominated by the combined signal of (b) in a second portion of the same medical ultrasonic image frame.

21. The method of claim 10 wherein the first and second beam signals are associated with separate transmit events and are received from common spatial locations.

22. The method of claim 10 wherein the first and second beam signals are characterized by first and second temporal frequency bands, respectively.

23. The method of claim 10 wherein the first and second beam signals are characterized by first and second spatial frequency bands, respectively.

24. The method of claim 22 or 23 wherein the first and second frequency bands partially overlap in frequency and partially do not overlap in frequency.

25. The method of claim 10 wherein the beam signals combined in (b) are pre-compression signals.

26. The method of claim 10 wherein the beam signals combined in (b) are post-compression signals.

27. The method of claim 10 wherein the signals combined in (d) are pre-compression signals.

28. The method of claim 10 wherein the signals combined in (d) are post-compression signals.

29. In a medical ultrasonic imaging system, a system for generating a medical ultrasound image signal from at least first and second beam signals, said system comprising:
    (a) means for combining the first and second beam signals prior to detection;
    (b) means for combining the first and second beam signals after detection;
    (c) means for using the combined signals of both (a) and (b) in a single medical ultrasonic image frame.

30. The invention of claim 29 wherein the frame comprises first and second regions, and wherein the means for using causes the combined signal of (a) to dominate in the first region and the combined signal of (b) to dominate in the second region.

31. The invention of claim 29 wherein the frame comprises a plurality of pixels, and wherein the means for using uses the combined signals of both (a) and (b) in a selected one of the pixels.

32. The invention of claim 29 wherein the first and second beam signals are associated with separate transmit events and are received from common spatial locations.

33. The invention of claim 29 wherein the first and second beam signals are characterized by first and second temporal frequency bands, respectively.

34. The invention of claim 29 wherein the first and second beam signals are characterized by first and second spatial frequency bands, respectively.

35. The invention of claim 33 or 34 wherein the first and second frequency bands partially overlap in frequency and partially do not overlap in frequency.

36. The invention of claim 29 wherein the beam signals combined in (b) are pre-compression signals.

37. The invention of claim 29 wherein the beam signals combined in (b) are post-compression signals.

38. The invention of claim 29 wherein the combined signals used in (c) are pre-compression signals.

39. The invention of claim 29 wherein the combined signals used in (c) are post-compression signals.

40. In a medical ultrasonic imaging system, a system for generating a medical ultrasound image signal from at least first and second beam signals, said system comprising:
(a) means for combining the first and second beam signals prior to detection;
(b) means for combining the first and second beam signals after detection;
(c) means for generating a selection signal;
(d) means for combining the combined signals of (a) and (b) using weighting factors that vary as a function of the selection signal.

41. The invention of claim 40 wherein the means of (d) generates the selection signal at least in part as a function of a parameter of at least one of the first and second beam signals.

42. The invention of claim 41 wherein the parameter varies as a function of average amplitude of said at least one of the first and second beam signals.

43. The invention of claim 41 wherein the parameter varies as a function of variance of said at least one of the first and second beam signals.

44. The invention of claim 41 wherein the parameter varies as a function of coherence length of said at least one of the first and second beam signals.

45. The invention of claim 41 wherein the parameter varies as a function of signal to noise ratio of said at least one of the first and second beam signals.

46. The invention of claim 40 wherein in the combined signal of (d) is associated with a single pixel of a medical ultrasonic image frame.

47. The invention of claim 40 wherein the combined signal of (d) is dominated by the combined signal of (a) in a first portion of a medical ultrasound image frame, and wherein the combined signal of (d) is dominated by the combined signal of (b) in a second portion of the same medical ultrasound image frame.

48. The invention of claim 40 wherein the first and second beam signals are associated with separate transmit events and are received from common spatial locations.

49. The invention of claim 40 wherein the first and second beam signals are characterized by first and second temporal frequency bands, respectively.

50. The invention of claim 40 wherein the first and second beam signals are characterized by first and second spatial frequency bands, respectively.

51. The invention of claim 49 or 50 wherein the first and second frequency bands partially overlap in frequency and partially do not overlap in frequency.

52. The invention of claim 40 wherein the beam signals combined in (b) are pre-compression signals.

53. The invention of claim 40 wherein the beam signals combined in (b) are post-compression signals.

54. The invention of claim 40 wherein the combined signals used in (d) are pre-compression signals.

55. The invention of claim 40 wherein the combined signals used in (d) are post-compression signals.

56. A method for generating a medical ultrasound image from a beam signal, said method comprising:
(a) detecting the beam signal;
(b) combining at least two detected sub-bands of the beam signal after detection; and
(c) using the detected beam signal and the combined signal of (a) in a single medical ultrasound image signal.

57. The invention of claim 56 wherein the frame comprises first and second regions, and wherein the using act of (c) causes the detected beam signal of (a) to dominate in the first region and the combined signal of (b) to dominate in the second region.

58. The invention of claim 56 wherein the frame comprises a plurality of pixels, and wherein the using act of (c) uses the detected beam signal of (a) and the combined signal of (g) in a selected one of the pixels.

59. The method of claim 56 wherein the sub-bands of the beam signals are characterized by first and second temporal frequency bands, respectively.

60. The method of claim 56 wherein the sub-bands of the beam signals are characterized by first and second spatial frequency bands, respectively.

61. The method of claim 59 or 60 wherein the first and second frequency bands partially overlap in frequency and partially do not overlap in frequency.

62. The method of claim 56 wherein the sub-bands combined in (b) are pre-compression signals.

63. The method of claim 56 wherein the sub-bands combined in (b) are post-compression signals.

64. The method of claim 56 wherein the signals used in (c) are pre-compression signals.

65. The method of claim 56 wherein the signals used in (c) are post-compression signals.

66. A method for generating a medical ultrasound image from a beam signal, said method comprising:
(a) detecting the beam signal;
(b) combining at least two detected sub-bands of the beam signal after detection;
(c) generating a selection signal;
(d) combining the detected beam signal and the combined signal of (b) using weighting factors that vary as a function of the selection signal.

67. The method of claim 66 wherein the selection signal is generated in (c) at least in part as a function of a parameter of at least one of the beam signal and the sub-bands of the beam signal.

68. The method of claim 67 wherein the parameter varies as a function of average amplitude of said at least one of the beam signal and the first and second sub-bands.

69. The method of claim 67 wherein the parameter varies as a function of variance of said at least one of the beam signal and the first and second sub-bands.

70. The method of claim 67 wherein the parameter varies as a function of coherence factor of said at least one of the beam signal and the first and second sub-bands.

71. The method of claim 67 wherein the parameter varies as a function of signal to noise ratio of said at least one of the beam signal and the first and second sub-bands.

72. The method of claim 67 wherein the parameter varies as a function of a histogram of at least a portion of said at least one of the beam signal and the first and second sub-bands.

73. The method of claim 72 wherein said at least a portion comprises a single acoustic line.

74. The method of claim 72 wherein said at least a portion comprises an image frame.

75. The method of claim 66 wherein the combined signal of (d) is associated with a single pixel of a medical ultrasonic image frame.

76. The method of claim 66 wherein the combined signal of (d) is dominated by the beam signal in a first portion of a medical ultrasound image frame, and wherein the combined signal of (d) is dominated by the combined signal of (b) in a second portion of the same ultrasonic image frame.

77. The method of claim 66 wherein the first and second sub-bands are characterized by first and second temporal frequency bands, respectively.

78. The method of claim 66 wherein the first and second sub-bands are characterized by first and second spatial frequency bands, respectively.

79. The method of claim 77 or 78 wherein the first and second frequency bands partially overlap in frequency and partially do not overlap in frequency.

80. The method of claim 66 wherein the sub-bands combined in (b) are pre-compression signals.

81. The method of claim 66 wherein the sub-bands combined in (b) are post-compression signals.

82. The method of claim 66 wherein the signals combined in (d) are pre-compression signals.

83. The method of claim 66 wherein the signals combined in (d) are post-compression signals.

* * * * *